Patented Dec. 8, 1931

1,835,747

UNITED STATES PATENT OFFICE

LOUIS BARTELSTONE, OF FLATBUSH, NEW YORK, ASSIGNOR, BY MESNE ASSIGNMENTS, TO ELBEE HOLDING CORPORATION, OF WILMINGTON, DELAWARE, A CORPORATION OF DELAWARE

CELLULOSE ACETATE METHOD OF LAMINATING

No Drawing. Original application filed June 3, 1926, Serial No. 113,580. Divided and this application filed June 3, 1926. Serial No. 113,581.

This invention is devoted specifically to laminated glass and the process of making it wherein the glass surfaces are conditioned through the agency of a film of cellulose acetate; this application being a division of my second copending application Serial No. 113,580 filed June 3, 1926, disclosing the use of both the nitrate and the acetate of cellulose, and being also a continuation in part of my first application Serial No. 729,069 filed July 30, 1924, and patented December 14, 1926, No. 1,611,139, said latter application setting forth my basic discovery that through a proper employment of an expressed vegetable oil of insignificant solvent action on celluloid (castor oil being indicated as one especially appropriate) a conditioned glass surface may be very strongly adhered to a sheet of celluloid or of a cellulose compound.

Independently of my aforesaid disclosures, the art has been unaware of any method of bringing about an adhesion (between cellulose acetate and cellulose) of an efficiency corresponding to what might be termed a weld. These products are quite different, chemically as well as physically, save for the fact that they are each transparent and flexible, and such methods as were known seemed to indicate that they manifested properties incompatible with mutual adhesion. Consequently, in laminating celluloid and glass sheets, it has been customary for others always to condition the surface of the glass by an initial application of a solution of celluloid; avoiding attempts to use solutions of cellulose acetate under the belief that the latter was incompatible with the celluloid sheet, although it was recognized that cellulose acetate might be expected to exhibit certain optically desirable superior characteristics if it could be used as a conditioning agent.

I have discovered, however, that by drawing upon the various discoveries set forth in my two previous applications, it is possible to bring about an adhesion sufficiently tenacious to answer for many purposes, although perhaps not quite equalling the extraordinary degree of adhesion obtainable as recited in my earlier application and in my second application with respect to the use of cellulose nitrate.

In carrying out my process wherein cellulose acetate is used for conditioning the glass preparatory to carrying out the ultimate laminating steps, the material will first be applied to the glass in the form of a solution. The solution which I have found most satisfactory is readily obtainable on the market; being known commercially as so-called "air plane dope" and which consists primarily of cellulose acetate dissolved in various solvents which admit of being quickly and easily evaporated to produce a tough film of cellulose acetate free from any easily inflammable ingredients such as camphor or similar plasticizing ingredients used in making celluloid-like material. This solution possesses considerable viscosity and may be applied to the glass surface either by spraying or other spreading methods and in a sufficient amount so that when ultimately dried the film of cellulose acetate will be quite thin, say in the neighborhood of 1/1000 of an inch. The drying may be accomplished spontaneously or it may be hastened by putting the prepared glass in heated cabinets for a sufficient period of time to eliminate the solvents.

The non-vitreous laminating elements may be a sheet of high-grade celluloid or of other organic transparent material and, to remove superficial grease or dirt from its surface, which would tend to inhibit adhesion, it is preferably sprayed with a solution of a cellulose compound or preferably with a solution of celluloid. These flexible sheets are then submitted to an air-bath or other conventional means for expediting evaporation of the solvent.

The conditioned panes of glass or sheets of celluloid, are then copiously coated with a vegetable oil preferably such as has been made by the expression of vegetable matter and which exhibits no consequential capacity for dissolving celluloid. The vegetable oil which I have found most effective is high grade castor oil. After the surfaces have been well smeared with this oil, the sheets are superimposed and the excess oil is permitted to gravitate away until it has in large part oozed out from between the sheets. The superimposed sheets are then transferred to the platen of an appropriate press, preferably hydraulic, and the temperature of the platen is maintained in the neighborhood of 220° F. For 3-ply laminated sheets which total about a 1/4" in thickness it is recommended that the pressure be increased step by step until it has obtained approximately 100 pounds to the square inch. It is then maintained at that pressure for say six minutes or so; whereupon the press may be opened and the hot laminated plate removed. It will be found that the laminations are adhering with great tenacity. For 5-ply glass consisting of two sheets of celluloid and three sheets of glass, which may total a thickness of about 1", the pressure should be gradually increased step by step until it totals about 200 pounds to the square inch and it is then maintained for about eight minutes at a temperature of say 220°. This will suffice to accomplish a good adherence between the laminations even though, ordinarily speaking, it would be supposed that the celluloid could not be caused to adhere strongly to the film of cellulose acetate which coats the glass surface.

Having thus revealed this invention, I claim as new and desire to secure the following combinations and elements, or equivalents thereof, by Letters Patent of the United States:—

1. An article of manufacture comprising two panes of glass; an intervening sheet of celluloid; and intermediate transparent films of a camphor-free cellulose acetate, said films being in immediate contact with the inner glass surfaces.

2. A process of conditioning a surface of glass for subsequently cementing it to a surface of celluloid, said process comprehending the deposition on said glass surface of a thin liquid film of cellulose acetate free from camphor and then converting said liquid film into a film of solid cellulose acetate free from volatile matter.

3. An article in the nature of laminated glass comprising external panes of glass; an intervening sheet of flexible transparent material; and a solid film of cellulose acetate intermediate each of the contiguous surfaces, said film of solid cellulose acetate being deposited directly upon the glass surface and being cemented to the contiguous surface of the flexible sheet.

4. An article of manufacture comprising two panes of glass; an intervening sheet of flexible transparent material; and intermediate films of a compound of cellulose and an organic acid radical, said films being transparent and free from volatile matter and in immediate contact with the inner glass surfaces.

5. A process of conditioning a surface of glass for subsequently cementing it to a surface of an organic flexible sheet, said process comprehending the step of coating said glass surface with a thin liquid film of a solution of cellulose acetate, and then evaporating all solvent and volatile matter from said liquid film to convert it into a film of solid cellulose acetate.

6. An article in the nature of laminated glass comprising external panes of glass; an intervening sheet of celluloid; and a film of cellulose acetate free from camphor intermediate each of the contiguous surfaces, said film of cellulose acetate being deposited directly upon the glass surface and cemented to the contiguous surface of the flexible sheet.

7. An article of manufacture comprising two panes of glass, an intervening sheet of celluloid surfaced by an evaporated film of celluloid; and intermediate films of cellulose acetate free from volatile matter, said films being in immediate contact with the inner glass surfaces.

8. A process of laminating glass consisting in first conditioning the inner surfaces of the glass by depositing thereon thin liquid films of a solution of cellulose acetate; then evaporating the solvent from said liquid film to convert it into a solid film; and then through the agency of a vegetable oil and under heat and pressure bringing said prepared surfaces into intimate contact.

9. An article of manufacture comprising two panes of glass; an intervening flexible sheet of substantial thickness composed of cellulose acetate; and intermediate transparent films of a thickness approximating a 1/1000 of an inch and composed of cellulose acetate free of camphor-like material, said films being in immediate contact with the inner glass surface.

10. A process of conditioning a surface of glass to render it adapted to be cemented to a flexible sheet of a cellulose compound, said process comprehending the application to said glass surface of a film of a cellulose acetate solution free from camphor-like ingredients and of such thickness that when subsequently dried into a solid form it will yield a film free from volatile matter and having a thickness approximating a 1/1000 of an inch.

11. A process of laminating glass consisting of first conditioning the inner surface of the glass by initially filming it with a solution of cellulose acetate free from camphor; then evaporating the solvents to produce a solid film; and then through the agency of an expressed vegetable oil causing said prepared surface to adhere to an intervening flexible transparent-sheet through the aid of heat and pressure.

In witness whereof, I have hereunto subscribed my name.

LOUIS BARTELSTONE.